United States Patent [19]

Mago

[11] 3,951,844

[45] Apr. 20, 1976

[54] CORROSION INHIBITION OF AQUEOUS POTASSIUM CARBONATE GAS TREATING SYSTEMS

[75] Inventor: Blake F. Mago, New City, N.Y.

[73] Assignee: Union Carbide Corporation, New York, N.Y.

[22] Filed: Apr. 29, 1974

[21] Appl. No.: 464,858

[52] U.S. Cl. ............................... 252/192; 21/2.7 R; 252/387; 252/389 R; 423/232
[51] Int. Cl.² ................... C23F 11/18; C23F 11/10; B01D 53/34
[58] Field of Search ................ 252/192, 389 R, 387; 21/2.7 R; 423/232, 229

[56] References Cited

UNITED STATES PATENTS

| | | | |
|---|---|---|---|
| 3,101,996 | 8/1963 | Bresler et al. | 423/232 |
| 3,808,140 | 4/1974 | Mago et al. | 252/389 R |

*Primary Examiner*—Leland A. Sebastian
*Assistant Examiner*—Irwin Gluck
*Attorney, Agent, or Firm*—Marylin Klosty

[57] ABSTRACT

Corrosion inhibition of ferrous metals by aqueous potassium carbonate solutions in acid gas treating systems is effected by a combination of antimony compounds with vanadium anions in the plus 5 valence state.

9 Claims, No Drawings

3,951,844

CORROSION INHIBITION OF AQUEOUS POTASSIUM CARBONATE GAS TREATING SYSTEMS

BACKGROUND OF THE INVENTION

This invention pertains to the prevention of corrosion of ferrous metals of aqueous potassium carbonate solutions in acid gas-treating plants.

Aqueous potassium carbonate solutions are used for the removal of carbon dioxide, hydrogen sulfide and other acidic gaseous constituents from natural gas, flue gas, synthesis gas, and the like. In this gas-treating process the aqueous potassium carbonate is continuously cycled from an absorber, in which acidic gases are taken up, to a stripper in which the acidic gases are expelled by modifying the overhead pressure and the solution temperature. The potassium carbonate content of these solutions can vary within a range of about 20 to about 40 percent, depending upon the individual installation, and may contain monoethanolamine, diethanolamine, amine borates, and the like to assist gaseous absorption. In all of these compositions however, the absorbing solutions are very corrosive to ferrous metals with which they come into contact.

Numerous investigators have studied the corrosion of aqueous potassium carbonate solutions and the incorporation of additives in them for corrosion prevention. For example Bienstock and Field reported in Corrosion, Vol. 17, page 337t (1961) that higher concentrations of potassium carbonate were more corrosive than lower concentrations and that sparging with carbon dioxide greatly increased this corrosion. Analysis of the solutions showed that carbon dioxide caused conversion of 15 to 20 percent of the carbonate to bicarbonate, thus suggesting that the bicarbonate is the more corrosive species. If the sparging gas contained hydrogen sulfide, corrosion was less even if carbon dioxide were present but in commercial plant usage, operating problems still resulted from corrosion. Bienstock and Field subsequently reported in Corrosion, Vol. 17, page 571t (1961) that 0.2 percent of sodium chromate or sodium metavanadate prevented most of the attack of ferrous metals although some pitting was noted in crevices with the chromate-inhibited solutions.

Negra and McCloskey disclosed in U.S. Pat. No. 3,087,778 that trivalent compounds of arsenic, antimony, bismuth and phosphorus acted as inhibitors for both liquid and vapor corrosive attack.

Banks, in Material Protection, Vol. 6, page 37 (1967) studied the corrosivity of used solutions from gas absorption plant installations and laboratory-prepared solutions containing concentrations of potassium carbonate and potassium bicarbonate typical of those used in service. His polarization studies indicated that metavanadate salts passivate mild steel only if the bicarbonate level was low. Once passivated, however, the steel would remain even so if the carbonate were partly converted to bicarbonate by carbon dioxide. In tests simulating plant conditions, corrosion was greater under impingement conditions such as at elbows than when film disruptive conditions were absent. Under such conditions even stainless steel alloys may also be attacked.

Eickmeyer in British Pat. No. 1,142,317 revealed that although 0.1 to 0.3 percent of sodium metavanadate effectively inhibits attack of steel in laboratory experiments, such concentrations were inadequate in actual plant use. He attributed this phenomenon to a more favorable solution volume to exposed steel surface in laboratory experiments which in effect results in more inhibitor ions being available for metal protection. He teaches that it is necessary to employ an oxidant in conjunction with vanadium ions in order to keep them active as corrosion inhibitors.

SUMMARY OF THE INVENTION

It has now been found that aqueous solutions employed in acid gas removal service containing about 20 to 40 percent by weight of potassium carbonate as the absorbent may be inhibited against corrosion of ferrous metal surfaces by incorporating therein an inhibiting amount of a mixture of about 9 to 1 parts by weight of a vanadium compound capable of ionizing in said aqueous potassium carbonate solution to provide pentavalent vanadium ions and about 1 to about 9 parts by weight of an antimony compound which is at least partially soluble in said aqueous potassium carbonate solution.

The term "soluble in said aqueous potassium carbonate solution" as used in this invention is intended to mean solubilities as low as about 0.01 grams per 100 ml. of aqueous potassium carbonate solution employed in acid gas removal service.

Although antimony and vanadium compounds have been used separately as corrosion inhibitors for carbonate solutions in the past, the combination of pentavalent vanadium ion and a soluble antimony compound afford surprisingly superior inhibition than is available from either inhibitor used alone.

DESCRIPTION OF THE INVENTION

The preferred antimony compounds used in this invention are antimonyl compounds such as, alkali metal antimonyl tartrates, alkali metal antimonyl gluconates and other such antimony derivatives of polyhydroxy organic acids, wherein the aliphatic carboxylic acid moiety has from about two to about six carbon atoms. A preferred antimony compound is potassium antimonyl tartrate having the formula: $K(SbOH_2)C_4H_2O_6 \cdot 1/2 H_2O$ as well as sodium antimonyl tartrate.

Other antimonyl compounds which can be used in the process of this invention include antimony trioxide or pentoxide reaction products with orthodihydric phenols, sugar alcohols, and similar hydroxy compounds which form definite but complex compounds.

Additional antimonyl compounds which can be used in this invention include oxides of antimony such as antimony trioxide, $Sb_2O_3$, antimony tetroxide, $Sb_2O_4$, antimony pentoxide, $Sb_2O_5$, alkali metal meta-antimonites, pyro-antimonates and meta-antimonates, antimony sulphates, and the like.

For convenience in introducing the antimony compounds into the aqueous potassium carbonate solution, it is preferred although not required to employ them in conjunction with solubilizing or chelating agents, such as, tartaric acid, ethylene diamine tetra-acetic acid, and the like in amounts ranging from 1.0 to about 50 percent by weight of the antimony compounds.

Still another group of antimony compounds which can be used is antimony-carbon compounds, i.e., organometallic compounds of antimony. These are exemplified by the arylstibonic acids having aa generic formula, $ArSbO_3H_2$ where Ar represents an aryl group. Specific examples include para-amino benzene stibonic acid, $p-NH_2C_6SbO_3H_2$, para-diethylamino benzene stibamine, para-acetaminobenzene stibonic acid and its alkali metal salts, para-stibosoacetanilide, $OSbC_6H_4NHCOCH_3$, and the like.

In using the antimony and vanadium compounds of this invention the respective compounds are mixed together such that there is a ratio of from about 9 to about 1 parts by weight of antimony compound to about 1 to about 9 parts by weight of vanadium compound capable of affording pentavalent vanadium ions. The preferred ratios are from about 4 to 6 parts to about 6 to 4 parts with equal parts most preferred.

The combination of antimony compound and vanadium compound is added to the acid gas removal system at a concentration ranging from about 0.01 to about 2.0 per cent by weight based on the weight of the aqueous potassium carbonate solution plus any other additives which may be present such as alkanolamines.

The choice of the starting vanadium compound from which the pentavalent vanadium ion is generated, as for example by hydrolysis, is not critical since it is the pentavalent vanadium ion itself which is the active corrosion inhibiting species when mixed in combination with the appropriate antimony compound. The vanadium compound when introduced into the aqueous potassium carbonate solution can be in any valence state capable of being oxidized to the plus 5 valence state in situ. The vanadium compound can be an organic or an inorganic compound. Thus, for example, one can employ vanadium oxide such as $VO$, $V_2O_3$, $VO_2$, $V_2O_5$ and the like; vanadium cyanides such as, $K_4V(CN)_6.3H_2O$, $K_3V(CN)_6$, $2KSCN.VO(SCN)_2.5H_2O$ and the like; vanadium halides, such as, fluorides, including $VF_3$, $VF_3.3H_2O$, $VF_4$, $VOF_2$, $VF_5$ or $VOF_3$, chlorides including $VCl_2$, $VCl_3$, $VCl_3.6H_2O$, $VOCl$, $VOCl_2$, $VOCl_3$, $V_2O_2Cl$, $V_2O_3Cl_2.4H_2O$ or $VO_2Cl_2.8H_2O$, bromides including $VBr_3$, $VBr_3.6H_2O$, $VOBr$, $VOBr_2$ or $VOBr_3$, and iodies including $VI_2$, $VI_3.6H_2O$ or $VI_4$; vanadium sulfates including $VSO_4.7H_2O$, $V_2(SO_4)_3$, $VOSO_4$ or $(VO)_2(SO_4)_3$; vanadates including orthovanadates, represented by the generic formula: $M_3VO_4$, pyrovanadates, represented by the general formula $M_4V_2O_7$ and metavanadates, represented by the general formula $MVO_3$ and the like where M represents a cation. The condensed vanadate ions which form in aqueous solutions, such as $V_6O_{17}^{4-}$ are also useful in this invention.

For convenience in introducing vanadate ions into the inhibiting systems of this invention the alkali metals, ammonium and alkaline earth vanadates including orthovanadates, pyrovanadates and metavanadates are preferred. Exemplary of such vanadates are the following: sodium metavanadate, potassium metavanadate, lithium metavanadate, ammonium metavanadate, sodium pyrovanadate, potassium pryovanadate, lithium pyrovanadate, ammonium pyrovanadate, sodium orthovanadate, potassium orthovanadate, lithium orthovanadate, ammonium orthovanadate, calcium orthovanadate, calcium pyrovanadate, calcium metavanadate, magnesium orthovanadate, magnesium pyrovanadate, magnesium metavanadate, ferrous orthovanadate, ferrous pyrovanadate, ferrous metavanadate, copper orthovanadate, copper pyrovanadate, copper metavanadate, and the like.

Other forms of vanadium that can be used in this invention include: the vanadovanadates, double vanadates, i.e., heteropoly acids containing vanadium and the peroxy vanadates having the general formula: $MVO_4$. The preferred cations represented by M are the alkali metal and ammonium cations.

Other vanadium compounds which can be used are vanadium oxides, vanadium cyanides, vanadium halides, and oxylalides, and like inorganic species.

One can also employ vanadium salts of aliphatic, naphthenic or aromatic acids, such as, acetic acid, propionic acid, pelargonic acid, stearic acid, cyclopentane carboxylic acid, cyclopentyl acetic acid, benzoic acid, naphthoic acid, diphenic acid and the like.

The compositions of this invention as well as the controls which demonstrate the prior art were evaluated as corrosion inhibitors for aqueous potassium carbonate solutions as follows. Inasmuch as the corrosion of steel by aqueous potassium carbonate solutions is most severe under film disruptive conditions as found in heat exchangers and reboilers, the evaluation studies were made with steel as the heat transfer surface for a boiling solution. A weight, cold-rolled, mild steel plate having the dimensions 4 inches × 4 inches × 1/16 inch that had been polished and scrubbed with a wet bristle brush and commercial kitchen powder cleanser, rinsed and dried was secured by means of a pipe joint arrangement to an inverted 500 ml. stainless steel beaker without a spout. The lip of the beaker thus served as a stop for a flange that could be bolted to a like flange on a special aluminum head for a 500-watt soldering iron. The steel plate was insulated from the head of the soldering iron with an asbestos ring and from the stainless steel beaker by a Teflon gasket. A standard Variac voltage controller was employed to control the heat input. A thermocouple well was welded into what had been the bottom of the beaker along with Swagelock fittings for inserting a stainless steel sparging tube and for a coupling to a glass condenser. A protruding stainless steel tube was also welded in place about half way up through the wall of the beaker. This steel tube was connected to a vertical glass tube having an unlubricated glass joint. This served as the salt bridge for determining the activity of the steel plate in reference to a standard calomel electrode. Potential measurements were made with a Keithley Model 210B Electrometer. The degree of corrosion was determined from the weight change of the steel plate before and after each run. Weight loss was recorded in units of mils per year (mpy). The steel plate was cleaned after each test by immersing it in a 10 per cent aqueous hydrochloric acid solution (weight/volume) containing a pickling inhibitor (Alkyl Pyridine R, a mixture of high boiling alkyl substituted pyridines having an equivalent weight of about 190 commercially available from Union Carbide Corp.), scrubbing it with a wet bristle brush and kitchen powder cleanser, rinsing it with water and acetone and then drying it in air.

It has been found that vanadates in particular and vanadium compounds in general are not safe or reliable corrosion inhibitors for aqueous potassium carbonate solutions used for scrubbing carbon dioxide from gas streams. The reduction of pentavalent vanadium ions can occur during plant service for a number of reasons. This reduction can be effected by steel surfaces activated by prior corrosion even where the corrosion is localized. The products of corrosion which build up in a system that has been operating with a corrosive solution for a time also can act as a reducing agent for pentavalent vanadium ions. Active sites of corrosion generated during operation can reduce pentavalent vanadium ions too. As will be demonstrated hereinafter, the addition of vanadates alone to a potassium carbonate-bicarbonate aqueous solution in contact with steel activated by incipient corrosion can lead to even more corrosion than would occur with an uninhibited solution. Moreover, aeration of such a solution will enhance the corrosion effects as a number of competing redox reactions occur. Thus where air is used in an attempt to maintain the higher oxidation level of vanadium ions, that is, at the pentavalent state, the air can act as a cathodic depolarizer and actually enhance corrosion.

Not only will the use of antimony salts in conjunction with vanadium ions in the pentavalent state lessen reduction of the vanadium ions by active steel surfaces but in addition even where complete reduction of vanadium ions has already occurred, the presence of an antimony compound facilitates the reoxidation of the reduced species by air or a chemical oxidant. The invention is further described in the examples which follow. All parts and percentages are by weight unless otherwise specified.

EXAMPLE 1

The apparatus outlined above was used but without measurement of the potential generated by the steel plate. Corrosion rates were measured after seven days exposure to 400 grams of boiling potassium carbonate aqueous solution which was sparged with 50 cc. per minute of carbon dioxide. The results obtained are delineated in Table 1. The data thus presented show that where no inhibitor was used in the gas treating solution composed of 35 percent by weight of potassium carbonate in distilled water that the corrosion rate of a mild steel plate was 333 mils per year. A 0.2 percent addition of sodium metavanadate resulted in a corrosion rate of 0.7 mils per year thus demonstrating the effectiveness of vanadium ion in the pentavalent state. In contrast, with the addition of 0.33 percent of vanadyl sulfate dihydrate, where vanadium is present in the quadrivalent state, the corrosion rate was 226 mils per year. The addition of 0.2 percent of potassium antimonyl tartrate in conjunction with 0.02 percent by weight of tartaric acid (added solely for the purpose of increasing the solubility of the potassium antimonyl tartrate) resulted in a corrosion rate of 111 mils per year. When 0.1 percent sodium metavanadate, 0.1 percent potassium antimonyl tartrate and 0.01 percent tartaric acid were added, the corrosion rate was only 0.5 mils per year.

EXAMPLE 2

The procedure described in Example 1 was repeated with the exception that the composition of the acid gas treating solution consisted of 30 percent of potassium carbonate and 3 percent monoethanolamine dissolved in distilled water. The results obtained which are delineated in Table 2 show the following corrosion rates: No inhibitor-238 mils per year; 0.2 percent sodium metavanadate-0.9 mils per year; 0.33 percent vanadyl sulfate dihydrate-268 mils per year; 0.2 percent potassium antimonyl tartrate with 0.02 percent tartaric acid 10.3 mils per year; and a mixture of 0.1 percent sodium metavanadate, 0.1 percent potassium antimonyl tartrate and 0.01 percent tartaric acid-0.6 mils per year.

The data of Examples 1 and 2 indicates the superiority of the combination of sodium metavanadate and potassium antimonyl tartrates over either alone although the improvements over the former are not as great as over the latter in these two preliminary experiments. The superiority of the combination is clearly demonstrated however in the following Examples which more nearly approximate plant conditions where some of the potassium carbonate becomes converted to potassium bicarbonate when heated and the steel surfaces in contact with the treating solution are activated as corrosion sites.

EXAMPLE 3

The apparatus described above was used in this Example but unlike the procedure in Examples 1 and 2 the potential generated on the test steel plates was measured against a saturated calomel electrode. The aqueous gas treating solution was heated without inhibitor present while sparging with $CO_2$ until a rapid decrease in potential showed that this pretreatment had activated the surface of the test steel plate. When this occurred aqueous concentrates of the inhibitors were added and their effect on potential noted. Heating was continued under reflux conditions at the boiling point for a two hour period in order to determine their effect on corrosion, as demonstrated by the weight loss of the plate.

The aqueous gas treating solution used contained 20 percent of potassium carbonate and 5 percent of potassium bicarbonate since this approximates the equilibrium ratio of the two salts that form upon heating on aqueous potassium carbonate solution at the boiling point in conjunction with $CO_2$ sparging.

In one series of experiments (A, B and C) three antimony compounds were evaluated sparging with $CO_2$ or $CO_2$ plus air. As shown in Table 3, both the open circuit potential and weight loss data indicates that potassium antimonyl tartrate, antimony tartrate and antimony lactate were unsatisfactory corrosion inhibitors both with $CO_2$ sparging and $CO_2$ plus air sparging.

A second set of experiments (D, E and F) showed that three pentavalent vanadium compounds were similarly ineffective as corrosion inhibitors. Sodium metavanadate which appeared effective in Examples 1 and 2 was demonstrated here to be unacceptable for conditions simulating actual plant use. Vanadium pentoxide and sodium orthovanadate were also ineffective corrosion inhibitors.

In sharp contrast when various combinations of antimony and vanadium compounds were used there was a marked lowering of the corrosion weight loss of the steel plates during the two hour heating period and open circuit potentials were consistently higher (Experiments G, H, I and J).

TABLE 1

| STEEL HEAT TRANSFER CORROSION IN AQUEOUS POTASSIUM CARBONATE ACID GAS TREATING SOLUTION SPARGED WITH CARBON DIOXIDE | | |
|---|---|---|
| Composition of Acid Gas Treating Solution | Inhibitor in Acid Gas Treating Solution | Corrosion Rate of Mild Steel Plate from Weight Loss, mpy(1) |
| 35% Potassium Carbonate in Distilled Water | None | 333 |
| 35% Potassium Carbonate in Distilled Water | 0.33% Vanadyl Sulfate Dihydrate | 226 |
| 35% Potassium Carbonate in Distilled Water | 0.2% Sodium | 0.7 |

TABLE 1-continued

STEEL HEAT TRANSFER CORROSION IN AQUEOUS POTASSIUM CARBONATE ACID GAS TREATING SOLUTION SPARGED WITH CARBON DIOXIDE

| Composition of Acid Gas Treating Solution | Inhibitor in Acid Gas Treating Solution | Corrosion Rate of Mild Steel Plate from Weight Loss, mpy(1) |
|---|---|---|
| 35% Potassium Carbonate in Distilled Water | Metavanadate 0.2% Potassium Antimonyl Tartrate and 0.02% Tartaric Acid | 1.1 |
| 35% Potassium Carbonate in Distilled Water | 0.1% Sodium Metavanadate 0.1% Potassium Antimonyl Tartrate and 0.01% Tartaric Acid | 0.5 |

(1) Mils per year

TABLE 2

STEEL HEAT TRANSFER CORROSION IN A MIXTURE OF AQUEOUS POTASSIUM CARBONATE-MONOETHANOLAMINE ACID GAS TREATING MIXTURE SPARGED WITH CARBON DIOXIDE

| Composition of Acid Gas Treating Solution | Inhibitor in Acid Gas Treating | Corrosion Rate of Mild Steel Plate (mpy) |
|---|---|---|
| 30% Potassium Carbonate in Distilled Water Plus 3% Monoethanolamine | None | 238 |
| 30% Potassium Carbonate in Distilled Water Plus 3% Monoethanolamine | 0.33% Vanadyl sulfate Dihydrate | 268 |
| 30% Potassium Carbonate in Distilled Water Plus 3% Monoethanolamine | 0.2% Sodium Metavanadate | 0.9 |
| 30% Potassium Carbonate in Distilled Water Plus 3% Monoethanolamine | 0.2% Potassium Antimonyl Tartrate and 0.02% tartaric Acid | 10.3 |
| 30% Potassium Carbonate in Distilled Water Plus 3% Monoethanolamine | 0.1% Sodium Metavanadate 0.1% Potassium Antimonyl Tartrate and 0.01% Tartaric Acid | 0.6 |

TABLE 3

INHIBITOR STUDIES WITH STEEL SURFACES ACTIVATED IN POTASSIUM CARBONATE SOLUTIONS

| Inhibitor(s) Added to Potassium-Carbonate-Bicarbonate Solution[1] After Activation of Steel Plate in That Solution | Sparging Gas(es) Used | Open Circuit Potential (mV) of Steel Plate vs Saturated Calomel Electrode After Addition | Open Circuit Potential (mV) of Steel Plate vs Saturated Calomel Electrode After Two Hours | Corrosion Weight Loss[2] of Steel Plate During Two Hour Heating Period |
|---|---|---|---|---|
| None | $CO_2$ | −1000 | −1000 | 75 |
|  | $CO_2$ Plus Air | −1000 | −1000 | 110 |
| Antimony Compounds | | | | |
| A. 0.1% Potassium Antimonyl Tartrate | $CO_2$ | −820 | −800 | 55 |
|  | $CO_2$ Plus Air | −800 | −180 | 149 |
| B. 0.1% Antimony Tartrate | $CO_2$ | −815 | −820 | 39 |
|  | $CO_2$ Plus Air | −800 | −440 | 66 |
| C. 0.1% Antimony Lactate | $CO_2$ | −810 | −830 | 33 |
|  | $CO_2$ Plus Air | −800 | −870 | 354 |
| Pentavalent Vanadium Compounds | | | | |
| D. 0.1% Vanadium Pentoxide | $CO_2$ | −900 | −915 | 196 |
|  | $CO_2$ Plus Air | −790 | −110 | 405 |
| E. 0.1% Sodium Metavanadate | $CO_2$ | −865 | −930 | 165 |
|  | $CO_2$ Plus Air | −880 | −125 | 421 |
| F. 0.1% Sodium Orthovanadate | $CO_2$ | −860 | −923 | 180 |
|  | $CO_2$ Plus Air | −900 | −765 | 827 |
| Combinations of Antimony and Vanadium Compounds | | | | |
| G. 0.05% Each of Potassium Antimonyl Tartrate and Sodium Metavanadate | $CO_2$ | −550 | −575 | 8 |
|  | $CO_2$ Plus Air | −520 | −280 | 11 |
| H. 0.05% Each of Potassium Antimonyl Tartrate and Vanadium Pentoxide | $CO_2$ | −540 | −560 | 5 |
|  | $CO_2$ Plus Air | −500 | −270 | 13 |
| I. 0.05% Each of Antimony Tartrate and Sodium Metavanadate | $CO_2$ | −570 | −600 | 7 |
|  | $CO_2$ Plus Air | −500 | −270 | 17 |
| J. 0.05% of Antimony Lactate and 0.033% of Sodium Orthovanadate | $CO_2$ | −610 | −550 | 12 |

TABLE 3-continued

INHIBITOR STUDIES WITH STEEL SURFACES ACTIVATED IN POTASSIUM CARBONATE SOLUTIONS

| Inhibitor (s) Added to Potassium-Carbonate-Bicarbonate Solution[1] After Activation of Steel Plate in That Solution | Sparging Gas (es) Used | Open Circuit Potential (mV) of Steel Plate vs Saturated Calomel Electrode | | Corrosion Weight Loss[2] of Steel Plate During Two Hour Heating Period |
|---|---|---|---|---|
| | | After Addition | After Two Hours | |
| 0.05% Each of Antimony Lactate and Sodium Orthovanadate | $CO_2$ Plus Air | −510 | −270 | 7 |

[1]This solution prepared to contain 20% $K_2CO_3$ and 5% $KHCO_3$ since this approximates the equilibrium ratio of the two that formed on heating solutions like these at their boiling points with $CO_2$ sparging.
[2]The average weight loss of steel in seven experiments conducted to determine corrosion loss before activation was 7±3 mg. Thus, 7mg has been subtracted from all the actual weight losses.

Although the invention has been described in its preferred forms with a certain degree of particularity, it is understood that the present disclosure of the preferred forms has been made only by way of example and that numerous changes may be made without departing from the spirit and scope of the invention.

What is claimed is:

1. A corrosion inhibited composition suitable for scrubbing carbon dioxide from acid gas streams consisting essentially of an aqueous solution of about 20 to 40 percent by weight of potassium carbonate and an inhibiting amount of a mixture of about 9 to about 1 parts by weight of a vanadium compound capable of ionizing in said aqueous solution of potassium carbonate to pentavalent vanadium ions and about 1 to about 9 parts by weight of an antimony compound which is at least partially soluble in said aqueous solution of potassium carbonate.

2. Composition claimed in claim 1 wherein the vanadium compound is an alkali metal metavanadate and the antimony compound is an alkali metal antimonyl tartrate.

3. Composition claimed in claim 2 wherein the alkali metal vanadate is sodium metavanadate and the alkali metal antimonyl tartrate is potassium antimonyl tartrate.

4. Composition claimed in claim 1 wherein the vanadium compound is an ammonium vanadate and the antimony compound is an alkali metal antimonyl tartrate.

5. Composition claimed in claim 2 containing in addition about 1.0 to about 50 percent by weight of a chelating agent based on the weight of said alkali metal antimonyl tartrate.

6. Composition claimed in claim 5 wherein the chelating agent is tartaric acid.

7. Composition claimed in claim 1 wherein the vanadium compound is a vanadium oxide.

8. Composition claimed in claim 7 wherein the vanadium oxide is vanadium pentoxide.

9. Composition claimed in claim 1 wherein said corrosion inhibitor is present in an amount of from 0.01 to about 2.0 percent by weight based upon the weight of said aqueous solution of potassium carbonate.

* * * * *

UNITED STATES PATENT OFFICE
CERTIFICATE OF CORRECTION

Patent No. 3,951,844    Dated April 20, 1976

Inventor(s) Blake F. Mago

It is certified that error appears in the above-identified patent and that said Letters Patent are hereby corrected as shown below:

Column 2, line 65, for "aa" read -- a --. Column 3, line 38, for "iodies" read -- iodides --. Column 4, line 5, for "oxylalides" read -- oxyhalides --. Column 6, line 2, for "o$^f$" read -- of --; line 28, for "noted" read -- rated. --. Columns 7-8, Table 3, in the heading of the last column of data, after "Period" read -- , mg --. Columns 9-10, Table 3-continued, in the heading of the last column of data, after "Period" read -- , mg --.

Signed and Sealed this

Third Day of May 1977

[SEAL]

Attest:

RUTH C. MASON
*Attesting Officer*

C. MARSHALL DANN
*Commissioner of Patents and Trademarks*